United States Patent [19]
Giros

[11] 4,091,737
[45] May 30, 1978

[54] HANDLING INSTALLATION FOR SUPPORTING DISPLACING AND STACKING LOADS IN PREDETERMINED POSITIONS

[75] Inventor: Marcel A. P. Giros, Ancerville, France

[73] Assignee: Societe Anonyme des Elevateurs Lateraux, Bar-le-Duc, France

[21] Appl. No.: 789,875

[22] Filed: Apr. 22, 1977

Related U.S. Application Data

[62] Division of Ser. No. 660,449, Feb. 23, 1976, Pat. No. 4,056,201.

[51] Int. Cl.² .............................................. B61B 12/02
[52] U.S. Cl. ................................ 104/242; 105/215 R; 214/16.4 A
[58] Field of Search .............. 214/16.4 A; 105/215 R, 105/215 C, 16.4 B; 104/242, 245, 247

[56] References Cited
U.S. PATENT DOCUMENTS

2,144,081  1/1939  Parte ................................. 105/215 C

FOREIGN PATENT DOCUMENTS

1,455,201  3/1969  Germany ........................ 214/16.4 A

Primary Examiner—Lawrence J. Oresky
Attorney, Agent, or Firm—Otto John Munz

[57] ABSTRACT

A handling installation designed for supporting, displacing and stacking loads in predetermined positions comprising, in combination, at least one load storage zone having at least one gangway extending therein, the or each gangway being provided on either side with fixed members comprising an upper track and a lower track, and a vehicle having tired support wheels for carrying the vehicle on the floor external to the or each gangway, and being further provided with flanged metal rollers for supporting the vehicle on the lower track during movement of the vehicle along the or a chosen gangway, the flanged metal rollers including inner flanges for guiding the vehicle on the lower tracks and the vertical spacing between the upper and lower tracks being sufficient to provide clearance for the flanged metal rollers while ensuring stability of the vehicle against any tilting movement of the vehicle when the vehicle is under load in the gangway.

1 Claim, 7 Drawing Figures

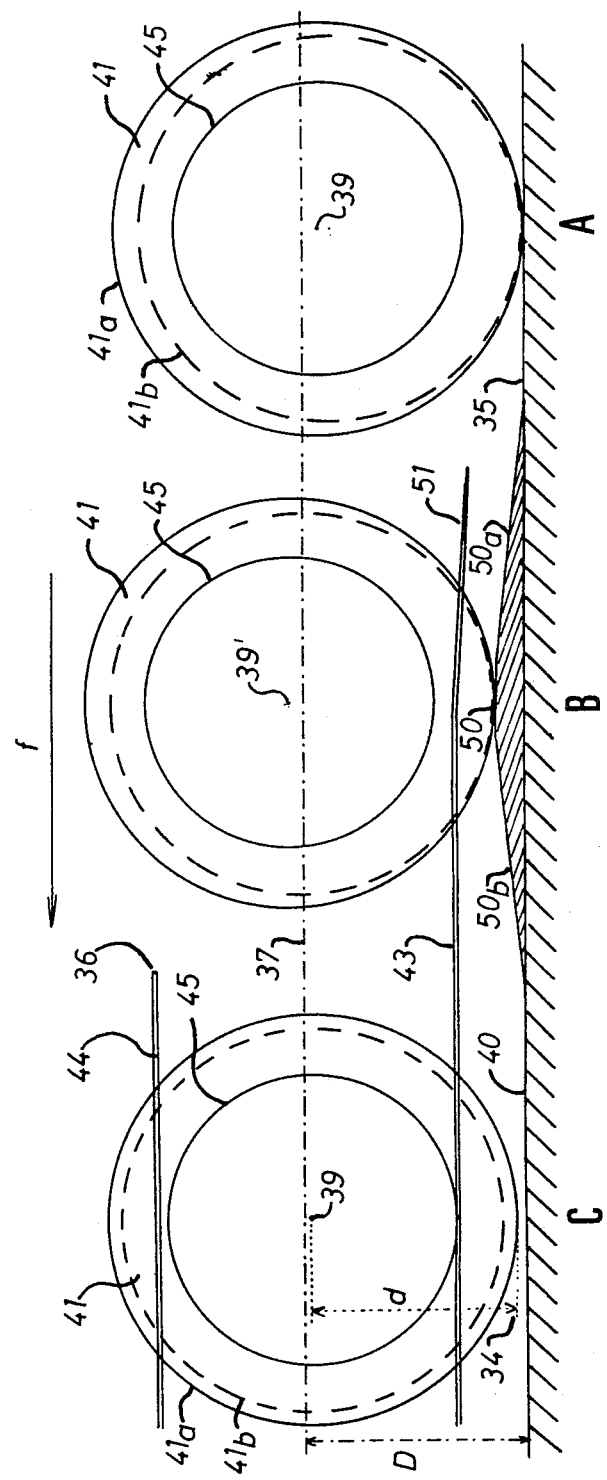

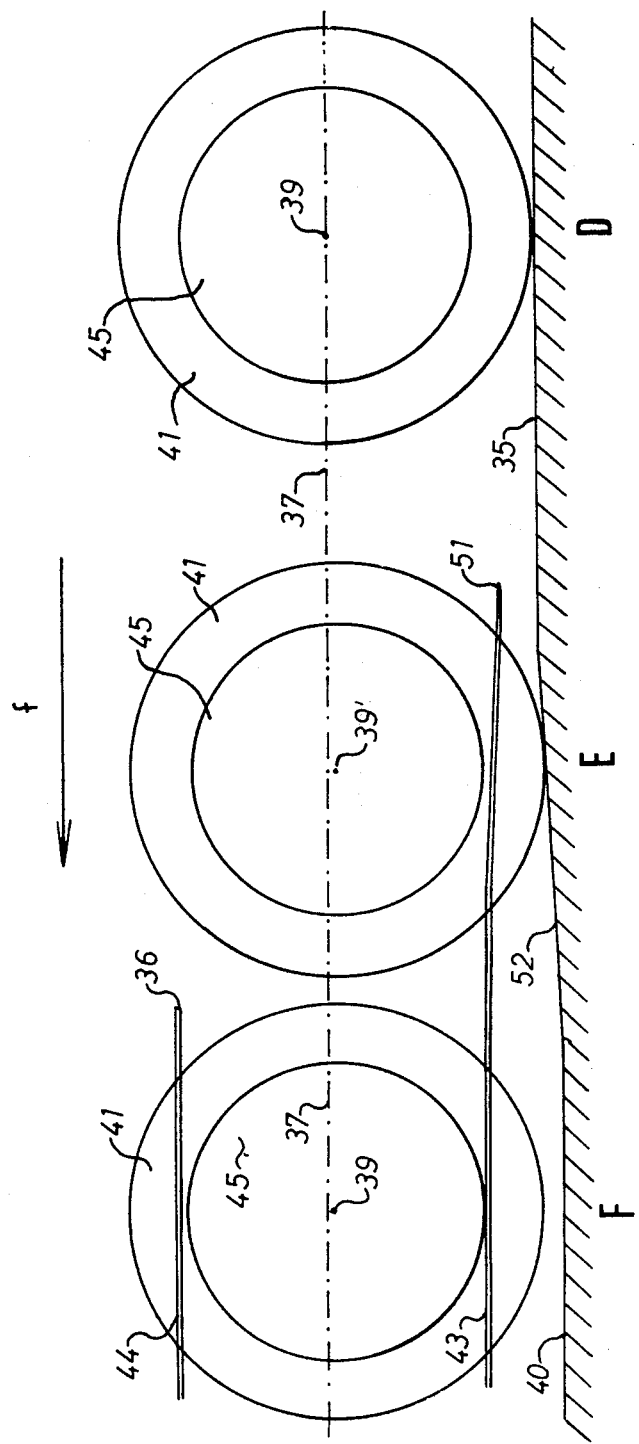

HANDLING INSTALLATION FOR SUPPORTING DISPLACING AND STACKING LOADS IN PREDETERMINED POSITIONS

CROSSREFERENCE TO RELATED APPLICATIONS

Priorities of parent application Ser. No. 660,449, filed Feb. 23, 1976 now U.S. Pat. No. 4,056,201 issued Nov. 1, 1977 as claimed for this divisional application.

BACKGROUND OF THE INVENTION

1. Field of the Invention

Loads of all kinds have to be handled in storage warehouses at great height with or without racks, and the main object of the invention is to provide an installation for such handling especially when the layout of the warehouse has to be frequently modified.

2. Description of the Prior Art

Among the known types of handling installations served by gangways giving passage to rolling trucks or units equipped with carrying, lifting and stacking means for loads, it has already been proposed to cause the units or trucks to run on rails in the gangways, so as to avoid wear on the floor and to relieve the driver of steering operations in the gangways, but in this case they are unable to leave the gangways by their own devices (this is the general case as regards transporting robot devices), or even to use the vertical surface of a section member in cooperation with rollers having vertical shafts fast with the trucks as guiding means. However, these means do not ensure the stability of the truck.

I have disclosed in my French Utility Certificate No. 2,096,846 how to cause removable means connected to the truck and capable of extending laterally, to bear either on a fixed frame or on the ground. These arrangements ensure the lateral stability of the truck, but they have the disadvantage of being only capable of being used with the stopping of the truck, previously brought into a precise position in relation to the loading locations to be served, and in addition of not preventing the longitudinal rocking of the truck under load.

However, a guiding or steering arrangement is known, of which the rollers have vertical shafts, which arrangement can prevent the rocking action by the rollers being held by their rim beneath a horizontal strip. However, in this blocked position, the rollers are unable to turn and any movement of the truck is excluded, as when it is locked on a fixed frame or on the ground.

SUMMARY OF THE INVENTION

The present invention provides an installation which comprises, in combination, at least one load storage zone having at least one gangway extending therein, the or each gangway being provided on either side with fixed members comprising an upper track and a lower track, and a vehicle having tired support wheels for carrying the vehicle on the floor external to the or each gangway, the tyred support wheels including one or more driving wheels and one or more steerable wheels and the vehicle being further provided with flanged metal rollers for supporting the vehicle on the lower track during movement of the vehicle along the or a chosen gangway, the flanged metal rollers including inner flanges for guiding the vehicle on the lower tracks the lower tracks being disposed at a sufficient height above the floor level in the load storage zone to raise the tyred support wheels off the floor when the vehicle is in the or a gangway, and the vertical spacing between the upper and lower tracks being sufficient to provide clearance for the flanged metal rollers whilst ensuring stability of the vehicle against any tilting movement of the vehicle when the vehicle is under load in the gangway.

The invention further provides a vehicle having tired support wheels for carrying the vehicle on a floor, including one or more driving wheels and one or more steerable wheels, and flanged metal rollers for supporting the vehicle on substantially horizontal support surfaces for movement along a gap extending between the support surfaces, the flanged metal rollers having inner flanges for guiding the vehicle along the gap and the height of the horizontal surfaces being sufficient to raise the tired support wheels off the ground when the vehicle moves along the gap.

The invention thus provides a simple solution for the guiding and for the lateral stability of the vehicle by the flanges of the rollers bearing on the tracks. Consequently, it becomes possible to dispense with the use of supplementary rollers with a vertical shaft for lateral guiding purposes, with which the lifting devices running on rails and of the prior type are generally equipped. A handling installation according to the invention thus provides the advantage of ensuring the stability of a vehicle in a service track provided with guiding section members, through which it travels from one end to the other in a load-storage zone, which may or may not be provided with storage racks, whether the vehicle is in motion or at rest, loaded or empty. As a result of the stability which is thereby assured, it is possible, in an installation according to the invention, to make use of the full available height of the load mast for the handling of loads without any danger of the lifting carriage overturning.

In the case where vehicles or trucks are concerned which also have to carry loads outside gangways, as for example fork-lift trucks, these have other roller trains as well as the pairs of rollers and are usually equipped with wheels. It is therefore possible to provide a relative disposition of the rollers, tracks, wheels and floor so that the transition from running on wheels on the floor outside the gangways to the running of the rollers on the tracks in the gangways is easily effected. For this purpose, the level of the floor of the gangway is offset downwardly in relation to the mean horizontal plane of the tracks, by a distance greater than that which separates a horizontal plane containing the shafts of the rollers from the tangent horizontal plane at a lower level than the wheels of the truck.

In practice, this arrangement determines the height position of the tracks relatively to the floor of the gangways as a function of that of the rollers relatively to the wheels on the truck. Depending on whether the warehouse is to be constructed or, on the contrary, whether the floor of the warehouse has already been provided for the running of trucks or vehicles (it may be expensive to modify it over large areas), the constructor will have the choice between two variants. In the first case, he will be able to provide, throughout the storage zone, including gangways, only a very rudimentary arrangement of the floor, since the latter will not have to support any rolling action. It is then convenient to select the levels in such a way that the level of the mean horizontal plane of the tracks coincides with the level of the horizontal plane containing the shafts of the rollers when the truck or carriage is rolling by means of its wheels on the floor outside the gangways and in the vicinity thereof; in the gangways, the wheels will lose contact with the floor, by the latter being arranged so that its level is lower than that of the floor outside the gangways. In the second case, the constructor will probably find it more simple only to prepare the ends of the gangways; he is then able to select the levels so that the level of the horizontal mean plane of the tracks is higher than the level of the horizontal plane containing the shafts of the rollers when the vehicle is running on its wheels on the floor outside the gangways. It is then convenient to arrange for the floor to slope at this position so as to obtain a difference in level which brings the horizontal plane containing the shafts of the rollers to the same level as the horizontal mean plane of the tracks, this permitting of keeping the floor of the gangways and the floor outside the gangways at the same level, thereby avoiding costly modifications. The preparation of the floor, thus provided, then consists in a ridge or hump, or even a single inclined plane, on which the truck is engaged at the end of the gangway for bringing the rollers into contact with the lower track. It must be noted that it is not unimportant to provide the hump, or the inclined plane, for the running of the wheels or the running of the rollers. Actually, if it is the rollers which rise on the inclined plane, there is every chance that the truck will slip, whereas if the inclined plane has been provided for the running of the wheels, the adhesion of the tyres on said wheels will enable the rollers to be brought without any difficulty to the height necessary for them to engage with the lower track. It is this last solution which is provided by the invention.

In order to facilitate the manoeuvring of the driver who wishes to enter a gangway, it is opportune to provide him with markers for enabling him to engage the rollers in a good transverse position in the tracks; the simplest means for this purpose consists in drawing two lines in the extension of each of the ends of the gangways, which lines show a longitudinal vertical plane on which a truck driver aligns a sighting line on the vehicle at his approach to the gangway. However, quite obviously the manoeuvre will also be facilitated by the tracks being extended slightly outside the gangway and by simultaneously increasing their transverse spacing, so that a first directional contact of the flange against a track (on the right or left) contributes to guiding the vehicle into the axis of the gangway.

Furthermore, in order to ensure a suitable speed of advance of the truck or vehicle as soon as the rollers become bearers on the lower track, the invention provides the combination of a sensitive device detecting the commencement of the bearing action of the rollers with a movement acceleration device, for example, for the vehicles with two electric motors, automatically changing the series coupling to parallel coupling.

Finally, it would be contrary to the scope of the invention to necessitate vehicles or trucks of a special form of manufacture, and even of not being adaptable to already existing vehicles. As the provision of a second motor for the rollers in order to move the vehicle in the gangways is excluded, the simplest solution is to make the shafts of one driving wheel or one pair of driving wheels coincide with the common shaft of a pair of rollers; the same motor and the same transmission, perhaps with a supplementary step-down ratio in one of the cases, will on the one hand drive the driving wheel or wheels and on the other hand the driving pair of rollers. In such cases, for the purpose of consequently establishing the diameter of the rollers relatively to the diameters of the wheels, it will be quite simple for a roller to be bolted in a fixed position on a driving wheel flange and the construction, like the modification of the previously existing vehicle, will be consequently less expensive. However, the best possible utilisation of the possibilities of the vehicle leads to adopting only a reduced number of pairs of driving rollers, and very often a single pair, each roller of the other pair or pairs being individually free. It will also be seen from one example that it is expedient to give the driving rollers a diameter which is slightly smaller than that of the free rollers in order to facilitate the movements of the vehicle in a position of controlled unbalance, and in the case of the gangways between racks, to fix their uprights and a rail of the lower track on load distribution plates.

Brief description of the Drawings

FIG. 4 is a side elevation of three positions A, B, C of a vehicle wheel coaxial with a running roller, before and after the said roller has engaged between a lower track and an upper track.

FIG. 5 is a side elevation of three positions D, E, and F, of a vehicle wheel coaxial with a roller, before and after the said roller has engaged between a lower track and an upper track, the means for effecting passage into these positions being a variant of that shown in FIG. 3.

DESCRIPTION OF THE PREFERRED EMBODIMENT

Figure 1:
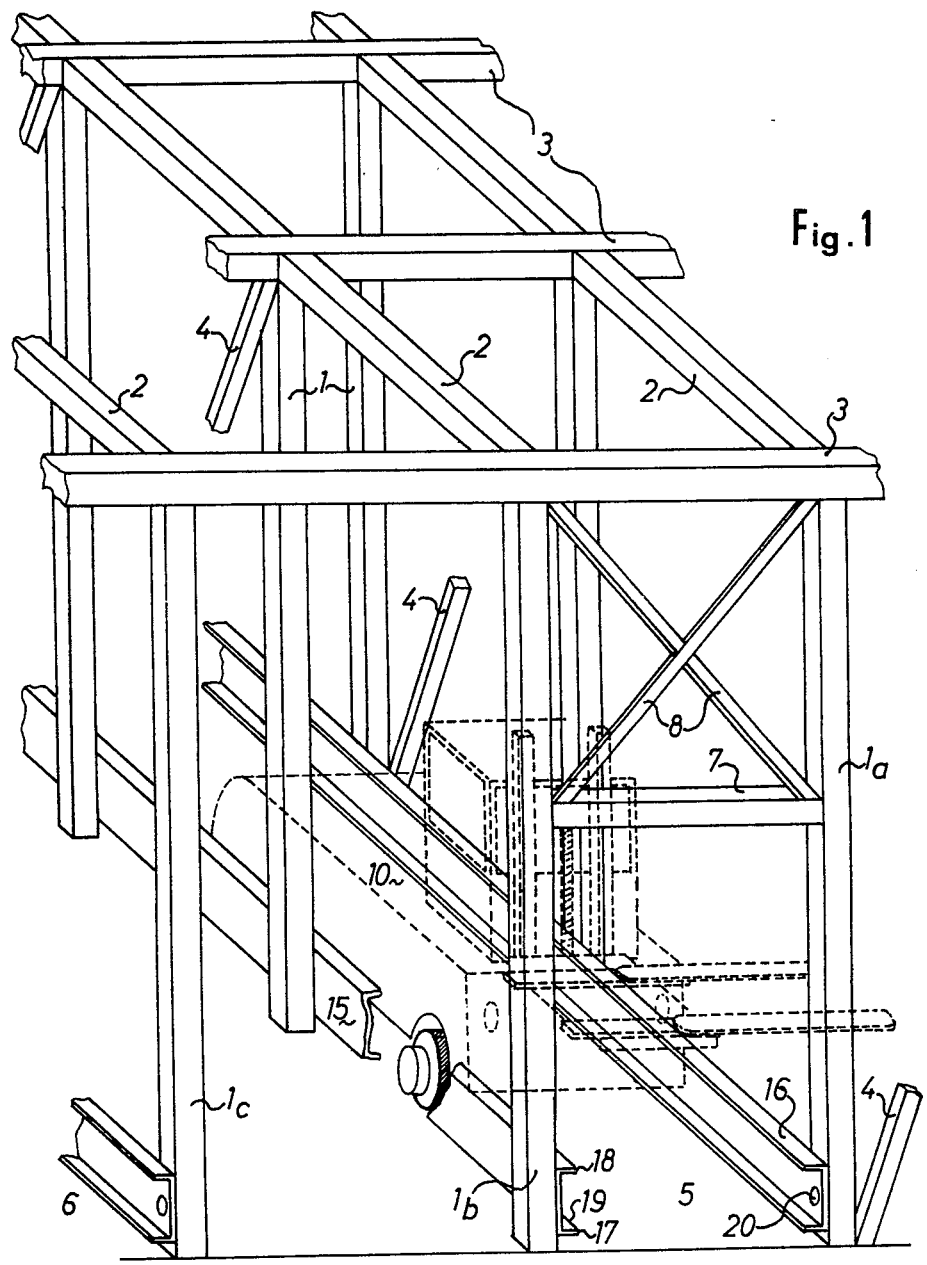
FIG. 1 and FIG. 2 are perspective views of an installation according to the invention, including a framework (FIG. 1) serving as support for racks, tracks for running, stability and guiding purposes, and a handling truck or vehicle engaged in a service gangway (best seen on FIG. 2).

Referring to the drawings, FIG. 1 shows part of a storage warehouse, and in particular one of the ends of a framework comprising uprights 1, longitudinal members 2, cross members 3 and bracing members 4, by and between which are supported storage racks (which are not shown so as not to make the drawing too involved). A service gangway 5 is formed between the rows of uprights 1a and 1b and their coacting members, over the full height of the framework. Fitted between the rows of uprights 1b and 1c is a double series of racks or compartments, back to back, served on one side by the gangway 5 and on the other side by the adjacent gangway 6 which is identical with the gangway 5. At the front there is shown an end of one of the gangways. A variant has been shown in which the gangways are obstructed at the end, over a fraction of their upper part, by low cross members, such as 7, which contribute with the bracing members 8 to the stability of the framework, but which can also serve a part in the safety of the manoeuvring of the handling vehicles, as will be explained later.

Figure 2:
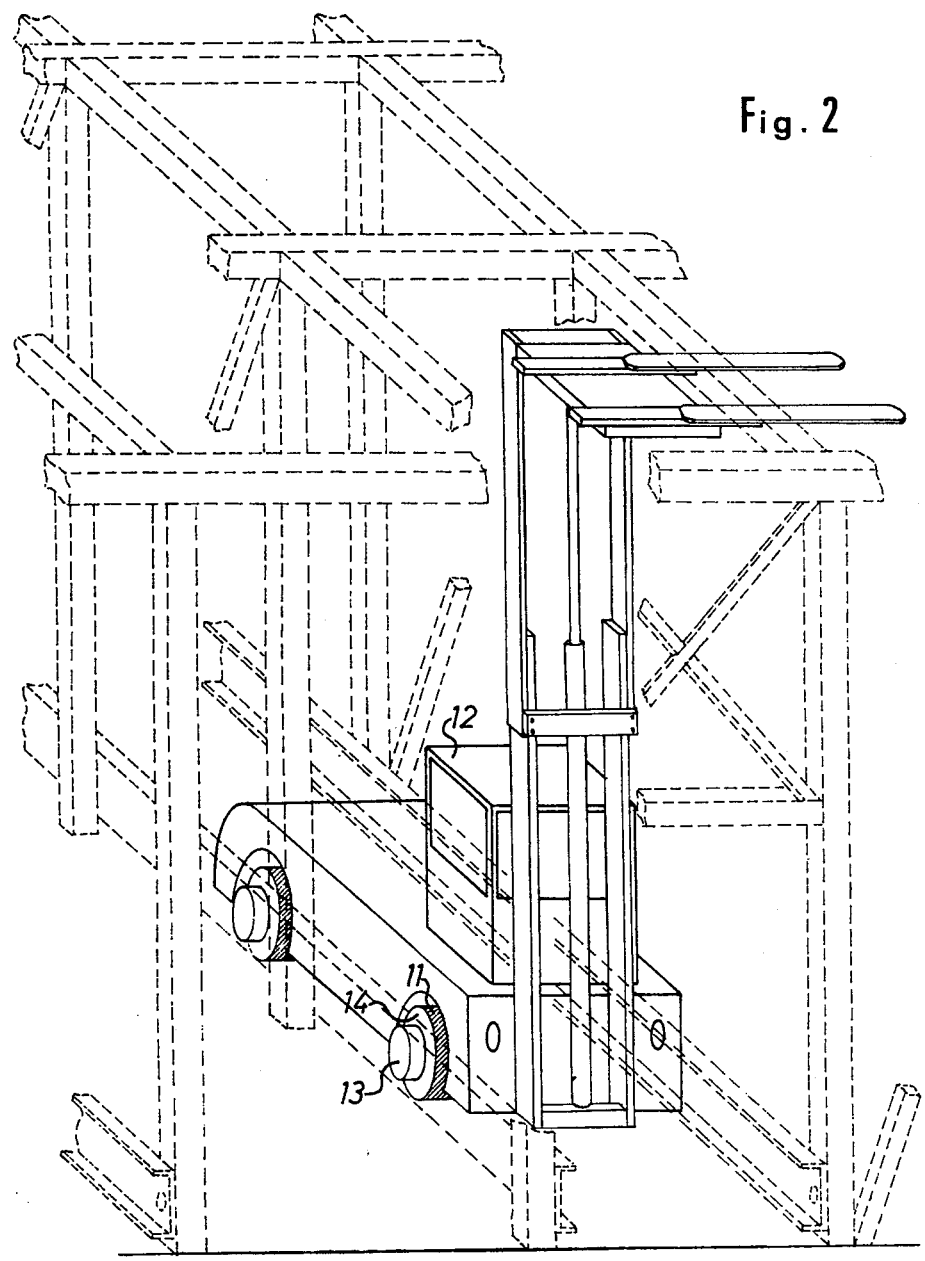

Also to be seen in FIG. 1 is a travelling handling vehicle 10 engaged in the gangway 5; as best seen on FIG. 2, this vehicle is here a fork-lift truck with bilateral engagement and a front mast, equipped with four wheels such as 11 and a cabin 12; coaxially with each wheel 11 is to be seen, projecting relatively to the transverse frame of the truck, a running roller 13 which is provided on the truck side with a flange 14. In the gangway, the wheels 11 are above and out of contact with the floor, and the truck rests with its rollers 13 engaged between the two horizontal tracks 17 and 18, and on the lower track 17 belonging for example to a section member such as 15. The transverse guiding of the truck is effected by contact of the flanges 14 against the edges, such as 19, of at least one track on each side. Also shown diagrammatically at 20 (FIG. 1) is a known means for regulating the height and the horizontal position of the tracks on an upright 1a, but the tracks can also be fixed in an adjustable manner at appropriate height above the floor by any known means, without departing from the scope of the invention.

Figure 3:
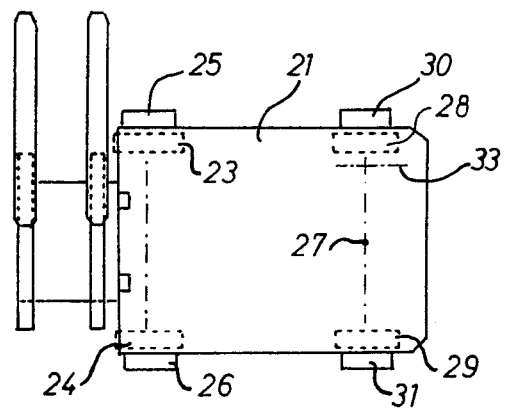
FIG. 3 is a plan view of a vehicle provided with wheels and running rollers.

A travelling handling truck 21 similar to the truck or vehicle 10 of FIGS. 1 and 2 is shown in FIG. 3, seen from above. It comprises, for example, driving wheels 23 and 24, of which the spindles or axles serve as shafts for the metal rollers 25 and 26, mounted on the outside of a transverse frame of the vehicle. The wheels 23 and 24 thus serve for driving the truck by its wheels on the floor outside the gangways and by its rollers on the tracks in the gangways. There is also shown a pair of wheels 28, 29 which are coaxial with the rollers 30, 31. These wheels provide for the steering of the truck outside the gangways. However, in the gangways, the truck is displaced in a straight line, guided along the tracks, and the manual steering becomes ineffective. However, it would also be possible to have a single guiding or steering wheel positioned at 27; in this case, each of the idle rollers 30 and 31 would be carried by an axle fast with the truck chassis, these axles only becoming aligned in a horizontal plane containing the axles or shafts of the driving rollers 25, 26. Also shown at 33 on this same figure is a sighting line on the vehicle, permitting a driver who is approaching a gangway to engage the rollers in the tracks to align the rollers transversely with the said tracks by sighting this line with a suitably marked distant point. This can also be useful if the steering position is not axially of the truck and particularly in the case when entering a gangway in reverse.

Shown in FIG. 4 is one of the modified forms of the means which can be used in the installation for permitting the transfer, in a progression of the truck or vehicle in the direction of the arrow f, from the running of the carriage on its wheels 41 on the floor 35 outside the gangways to a running by means of its rollers 45 on the tracks, of which the lower and upper horizontal surfaces in this figure bear respectively the references 43 and 44. This modification corresponds to the case where the floor 40 in the gangway is at the same level as the floor 35 outside the gangway. First of all, it can be seen at C that the distance "d" separating the axis 39 of the rollers 45 from the lower tangent horizontal plane 34 to the wheels 41, increased by the clearance between the rollers and the tracks, is smaller than the distance "D" from the mean plane 39 of the tracks 43 and 44 to the floor of the gangway 40. For this reason, the wheels 41 have lost, at C, contact with the floor of the gangway, have become inoperative and the truck or vehicle only advances because of its rollers.

It can then be seen at A that the level of the horizontal plane 37 is higher than that of the axis 39 of the rollers when the vehicle is running on its wheels 41 on the floor 35 outside the gangway. In order to ensure that the rollers 45 pass between the tracks 43, 44 with the advance of the wheels in the direction of the arrow f, it is then necessary to have a means for raising the axis 39 to the level of the plane 37. This means is represented at B in the particular form of a hump 50 provided locally on the floor in the immediate extension of and outside the gangway, so as to reach at its apex a suitable difference in level with the floor outside the gangway. On the entry slope 50a, 50, the vehicle rises by means of its wheels and the rollers 45 are adapted to engage bilaterally above an extension 51 (sloping downwardly to facilitate the engagement) of the lower track 43. When the wheels, continuing their advance, run on to the slope 50, 50b, the rollers are applied to and roll on the lower track 43, and the advance of the vehicle continues under the driving action of the rollers 45 (or of another pair of driving rollers already engaged further to the front of the vehicle) and the wheels 41 lose contact with the floor 40 of the gangway.

The modified form which has just been described is advantageous for converting an already existing installation, in which the floor is at the same level outside the gangway as inside the latter, into an installation according to the invention. For achieving this, it is sufficient to position humps such as 50, which can be easily removable chocks, to mount rollers 45 on the axles of the vehicle wheels, externally of the transverse frame of the latter, and to place tracks in position at a suitable level and spacing at either side of each gangway, or even on one side of the case of end racks or compartments.

It will also be seen at B in FIG. 4 that, at the apex 50 of the hump, the axis 39 of the rollers has assumed a slightly higher position 39', which is not strictly necessary for coinciding with the plane 37. This is however useful when using wheels 41 fitted with tires, of which the circumference when new is indicated at 41a and when badly worn is indicated at 41b: depending on the state of wear of the wheels, it is therefore necessary that the axis 39' of the rollers at least reaches the level of the plane 37 at the top 50 of the hump; the downward slope given to the toe 51 extending the lower track 43 cooperates with this condition, because this track will necessarily bring the roller 45 into position in the gap 43, 44, possibly making contact with its periphery for ending the ascending movement.

FIG. 5 corresponds to an installation in which the mean horizontal plane of the tracks 37 coincides with the horizontal plane in which the axis 39 of the rollers is displaced above the floor 35 outside the gangway. It is then no longer necessary to have a hump, as in the modified form described by reference to FIG. 4. It is sufficient to establish the floor 40 of the gangway at a level slightly below that of the floor 35 outside the gangway, by digging a shallow pit, for example, and connecting 35 and 40 by a gentle inclined plane 52. The inclination of the toe 51 extending the lower track 43 is still useful for compensating for the difference in level which is established with the wear on the tires of the wheels. This wear has not been shown in FIG. 5.

In each of the two examples represented in FIGS. 4 and 5, a symmetrical arrangement of the points of access to the gangway and of the toes of the track is also provided at the other end of the gangway, so that each of the ends can serve equally well for the entry and exit of the vehicle.

A means for assisting the driver in transversely aligning the rollers on the tracks for engaging them in the gangway has been mentioned above in connection with FIG. 3. Another simple means which can be provided is to give the toes 51 and even 36 of the tracks a widened-out form in plan view relatively to the axis of the gangway, that is to say, the spacing of the extended track outside the gangway increases, so that a lower track or even an upper track, commences at the earliest its directional effect on a flange (right or left) of the first pair of rollers entering the gangway; however, it is necessary for the slope of the toes to be studied as a function of the travel of the roller so that there is no danger of the flange jumping laterally over the toe, causing the vehicle to be derailed.

As already stated above and better explained hereinafter, while the vehicle is in the gangway and thus in the operational position for raising, lowering, removing or depositing loads of which the centre of gravity can be outside the supporting polygon of the vehicle, the said vehicle is stabilised against lateral and longitudinal rocking by its two pairs of rollers being maintained between the lower and upper tracks; this advantage makes possible a change in position under load and a saving of time in the operation by simultaneously effecting the shifting of loads relatively to the vehicle, at least in part, and the longitudinal displacement of the vehicle in the gangway; however, there would on the other hand be a danger of rocking if the load was still too high when the vehicle, leaving the gangway, loses the exceptional stability which is imparted to it by the engagement of the rollers in the tracks. This incorrect manoeuvre is prevented by the presence at each end of the gangway of the low cross members 7 and bracing members 8 already mentioned in connection with FIG. 1; obviously, the height of the cross members 7 is chosen so as only to allow passage of loads which are sufficiently lowered so that turning movements or acceleration of the vehicle do not jeopardise its stability when it is travelling with a load outside the gangways, that is to say, when it is reduced to its true stability; this point is all the more important when such a vehicle may be very substantially lightened relatively to an ordinary vehicle, which would only have its weight for ensuring its stability with the manoeuvring of loads outside its supporting polygon. However, it is also possible to ensure the safety by other known means, such as a member for sensing the position of the vehicle in the rails, capable of either preventing excessive lifting of the load or of moving the vehicle when it is off the rails.

Figure 6:
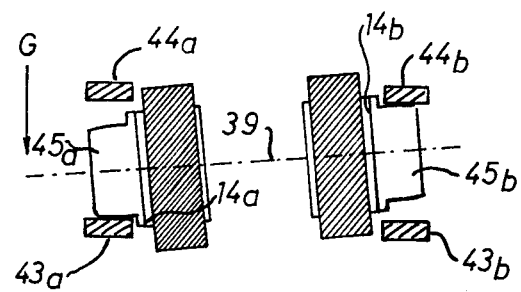
FIGS. 6 and 7 show the stabilising action of the tracks on the vehicle by its running rollers.

Shown in FIG. 6 is a transverse view of a pair of idle or free rollers (left 45a, right 45b) with a common axle 39 between the lower tracks (left 43a, right 43b) and upper tracks (left 44a, right 44b) in the position they occupy when the vehicle supporting a load has a centre of gravity G tending to cause it to rock towards the left and bringing it into controlled unbalance. This tilting movement lifts the roller 45b by a few millimeters until it is stopped against the upper track 44b. This clearance has been exaggerated in the figure for clarity of illustration. The upper track thus stops the transverse rocking movement. In this position, the vehicle can be displaced longitudinally under the action of the pair of driving rollers. Actually, the transverse guiding action continues to be assured by the flanges 14a and 14b; the rollers 45a and 45b turn in opposite directions in contact with the tracks 43a and 44b, and this is possible, since they are individually free on their axle. It would not be the same (without a special arrangement which would complicate the transmission) if the rollers as illustrated were driving rollers. However, it is seen that, whatever may be the side of the tilting movement, if the diameter of the pair of driving rollers is slightly smaller than that of the pair of free rollers, one of the two driving rollers is in contact with a lower track (on the tilting side), while the other driving roller is lifted, but not to a sufficient extent to come into contact with the upper track. It is sufficient for the chassis of the vehicle to be fairly rigid, so that its flexion in such a case does not reach the difference in the diameters. This other roller can thus turn idly in the same direction as the driving roller in contact with the lower track, which by itself assures the longitudinal movement of the vehicle.

Figure 7:
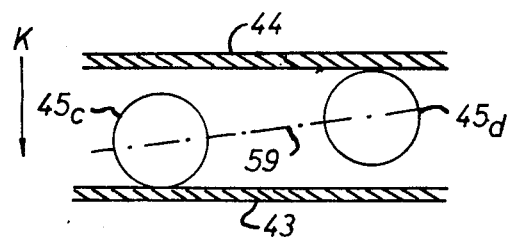

Represented in FIG. 7 is a side view of two rollers 45c and 45d belonging to two different pairs, one being a driving roller and the other a free roller, of a single vehicle engaged between the lower and upper tracks 43 and 44, respectively, in the position which they occupy when the vehicle manoeuvring under load is subjected to a longitudinal rocking torque K indicated by the arrow, bringing it into controlled unbalance. This tilting movement lifts the roller 45d by a few millimeters until it is stopped against the upper track 44; this clearance has been exaggerated in the figure for clarity of illustration. The upper track thus stops the longitudinal rocking movement. In this position, the vehicle can still be displaced longitudinally under the action of the pair of driving rollers, which may be either the pair 45a or the pair 45b, because the transverse guiding is still assured by the flanges against one or other track, as in FIG. 6, and the two rollers of a single pair are in contact with the same lower or upper track, and therefore turn in the same direction.

Having shown the stabilising action of the upper track against a transverse or longitudinal rocking movement, while still permitting the displacement of the vehicle, it follows that the same stabilisation is assured when the position of the centre of gravity of the loaded vehicle is such that it tends to cause simultaneously a longitudinal rocking and transverse rocking movement; there is in effect a composition of two actions related to two orthogonal axes, terminating in a tilting movement with controlled unbalance. The driver of the vehicle consequently does not have to concern himself with any rocking movement while he is manoeuvring the load and moves the vehicle while leaving at least two pairs of rollers engaged in the space between the two tracks.

I claim:

1. A vehicle and an installation for supporting said vehicle on substantially horizontal support surfaces having a gap extending between them,
    said vehicle having tired support wheels for carrying the vehicle on a floor;
    said horizontal support surfaces being spaced above said floor;
    at least one pair of driving wheels;
    at least one pair of steerable wheels, and
    a plurality of flanged metal rollers, each flanged metal roller being connected to each one of said pair of driving wheels and steerable wheels, respectively, for supporting the vehicle on said support surfaces for movement along said gap;
    the flanged metal rollers having inner flanges for guiding the vehicle along the gap and
    the height of the horizontal surfaces being sufficient to raise the tired support wheels off the ground when the vehicle moves along the gap, and when the vehicle is supported by said metal rollers resting on said support surfaces;

said flanged metal rollers on said corresponding driving wheels being larger in diameter than said flanged metal rollers on said corresponding steerable wheels, and said horizontal support surfaces comprising at least one upper horizontal track surface and one lever horizontal track surface, the spacing between said upper and lower horizontal track surfaces being greater than the diameter of said flanged metal rollers corresponding to said driving wheels;

whereby, if said vehicle is caused to be tilted when said flanged metal rollers are normally operating between said upper and lower horizontal track surfaces, the flanged metal rollers corresponding to said driving wheels remain in contact with the track surfaces, so that the vehicle can be displaced in said tilted condition.

* * * * *